(12) United States Patent
Bartov

(10) Patent No.: US 12,037,129 B2
(45) Date of Patent: Jul. 16, 2024

(54) DIAGNOSTIC PORT CAP

(71) Applicant: Federal Industries, Inc., El Segundo, CA (US)

(72) Inventor: Asher Bartov, Beverly Hills, CA (US)

(73) Assignee: Federal Industries, Inc., El Segundo, CA (US)

( * ) Notice: Subject to any disclaimer, the term of this patent is extended or adjusted under 35 U.S.C. 154(b) by 214 days.

(21) Appl. No.: 17/591,549

(22) Filed: Feb. 2, 2022

(65) Prior Publication Data

US 2023/0242269 A1    Aug. 3, 2023

(51) Int. Cl.
*B64D 39/02* (2006.01)

(52) U.S. Cl.
CPC .................. *B64D 39/02* (2013.01)

(58) Field of Classification Search
CPC ......... B64D 39/02; B64D 39/00; B64D 39/06
See application file for complete search history.

(56) References Cited

U.S. PATENT DOCUMENTS

| | | | |
|---|---|---|---|
| 5,996,939 A | 12/1999 | Higgs et al. | |
| 6,454,212 B1 * | 9/2002 | Bartov | B64D 39/02 244/135 C |
| 6,779,758 B2 | 8/2004 | Vu et al. | |
| 6,866,228 B2 | 3/2005 | Bartov | |
| 9,102,415 B2 | 8/2015 | Bartov | |
| 9,315,277 B2 | 4/2016 | Foo et al. | |
| 10,994,861 B2 | 5/2021 | Espinosa-Sanchez et al. | |
| 2017/0137145 A1 | 5/2017 | Peake | |

FOREIGN PATENT DOCUMENTS

GB        2373774 B    4/2003

* cited by examiner

*Primary Examiner* — Justin M Benedik
(74) *Attorney, Agent, or Firm* — William Thomas Babbitt, Esq.

(57) ABSTRACT

An apparatus comprising: a port cap operable to be coupled to a hydraulic motor/pump, the port cap comprising a first fluid port, a second fluid port and an access port; a first transducer coupled to the port cap through the first fluid port; a second transducer coupled to the port cap through the second fluid port; and a resolver coupled to the port cap through the access port, the resolver comprising a splined shaft to couple to an output shaft of the hydraulic motor/pump when the port cap is coupled to the hydraulic motor/pump. A system including a hydraulic motor/pump, a drive system controller and a port cap and a method of determining hose velocity, hose position, motor/pump torque and hose tension using data gathered at port cap.

15 Claims, 3 Drawing Sheets

DIAGNOSTIC PORT CAP

FIELD

Hose and cable reel assemblies.

BACKGROUND

Aerial refueling of a manned or unmanned receiver aircraft from a tanker aircraft is a difficult and dangerous maneuver that is typically attempted only by military personnel throughout the world. There are two primary fuel delivery systems currently utilized in aerial refueling: hose and drogue systems and flying boom systems.

In a hose-and-drogue fuel delivery system, a drogue is attached to an outlet end of a hose. An inlet end of the hose is attached to a hose reel onto which the hose is wound. The hose reel is typically mounted either within a tanker aircraft fuselage or on a refueling pod or module which is attached to the bottom of the tanker aircraft. The hose reel is commonly connected to a motor/pump that is hydraulically driven. The hydraulic motor/pump can be connected through a coupling system, which may include. e.g., various gear boxes, shafts, and couplings. When the hose is deployed from the tanker aircraft, the drogue encounters drag and the hose reel rotates in a trail direction in which the hose extends behind the tanker aircraft.

When the hose and the drogue are extended to a determined extent for connection by a receiver aircraft (e.g., full extension), the hose is in a free trail position. At free trail, the hose will be pushed backward (away from the front of the tanker aircraft) due to an aerodynamic drag on the drogue. This free trail drag force is referred to as a reference tension or load. With the hose of the tanker aircraft in a free trail position, a pilot of a receiver aircraft maneuvers the receiver aircraft to engage a refueling probe of the receiver aircraft with the drogue. Such engagements generally create slack in the hose because of the closing speed of the receiver aircraft pushing the hose forward. Such slack reduces the hose tension or load below the reference tension or load. Retracting the hose onto the hose reel eliminates the slack. The retracting or rewinding of the hose in such instance is referred to as "hose response."

After the drogue is engaged by a receiver aircraft, fuel can be pumped from the tanker aircraft to the receiver aircraft. When refueling is completed, the pilot of the receiver aircraft disengages the refueling probe from the drogue. The hose can then be retracted onto the hose reel for stowage by rotating the hose reel in a retract direction.

DETAILED DESCRIPTION

Figure 1:
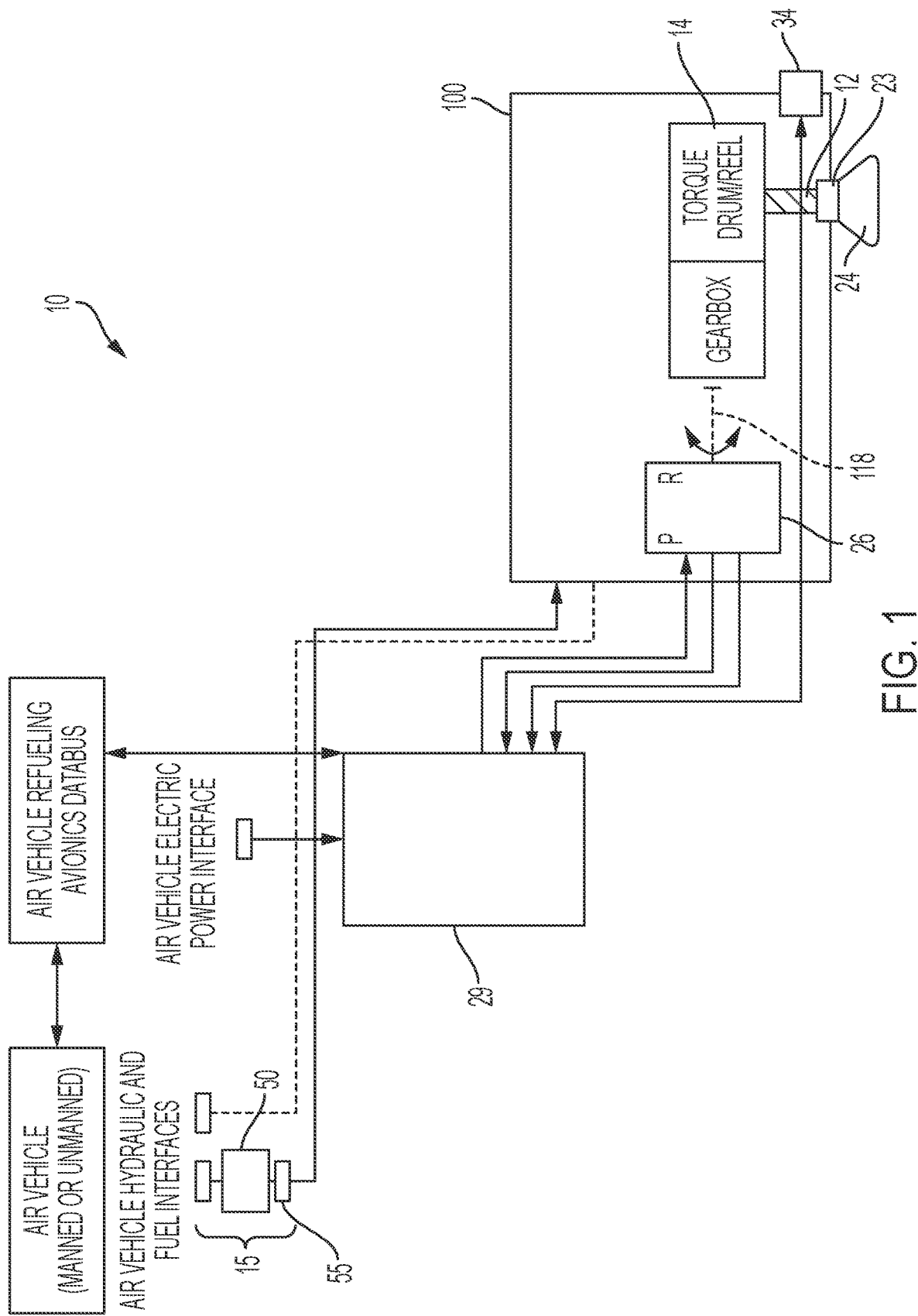
FIG. 1 shows a schematic diagram of a portion of an aerial refueling system.

A port cap for a hydraulic motor/pump is disclosed. Hydraulic motors/pumps generally convert pressure and flow of a hydraulic fluid into torque and speed. There are various types of hydraulic motors/pumps including piston type, gear type, vane type and generator rotor type. Port caps are commonly used on hydraulic motors/pumps and include a body having an inlet or pressure port and a return port. The pressure port accepts hydraulic fluid under pressure from a hydraulic pump into the motor/pump where, in a motor mode, the motor/pump converts the hydraulic pressure into torque and speed to, for example, drive (rotate) a shaft of the motor/pump and, in pump mode, the motor/pump increases the hydraulic pressure to, for example, restrict a rotation of the shaft (e.g., pump outlet may be restricted to create resistance and braking). The return port provides a return for the hydraulic fluid from the motor/pump to the hydraulic pump.

The port cap disclosed is operable to be coupled to a hydraulic motor/pump and includes a body including a first hydraulic fluid port, a second hydraulic fluid port and an access port. A first transducer, such as a pressure transducer, is coupled to the body of the port cap through the first fluid port and a second transducer (e.g., pressure transducer) is coupled to body of the port cap through the second fluid port. A resolver is coupled to the body of the port cap through the access port and includes a splined shaft to couple to an output shaft of a hydraulic motor/pump when the port cap is coupled to the hydraulic motor/pump. The inclusion of sensors such as the first and second transducers and the resolver at the port cap allows data generated by such sensors to monitor and diagnose a hydraulic motor/pump to which the port cap is installed as well as to monitor, diagnose and/or improve an operation of a system in which the hydraulic motor/pump is utilized.

A system is also described. The system comprises a hydraulic motor/pump including a port cap and a drive system controller. The port cap comprises a body comprising a first fluid port, a second fluid port and an access port. A first transducer is coupled to the drive system controller and to the body of the port cap through the first fluid port and a second transducer is coupled to the drive system controller and to the body through the second fluid port. A resolver is coupled to the drive system controller and to an output shaft of the hydraulic motor/pump through the access port. The drive system controller is operable to monitor, diagnose and/or improve an operation of a system based on the output of the transducers and/or the resolver. The hydraulic motor/pump may be connected to a hose reel that includes a hose connected thereto. The hydraulic motor/pump is operable to rotate the hose reel in one direction to extend the hose from the hose reel and in an opposite second direction to retract the hose to the hose reel. The drive system controller is operable to determine a velocity of the hose as well as a hose position (e.g., a distance a free end of the hose is relative to a stowed position) using an output signal from the resolver. The first and second transducers may provide the drive system controller with pressure data (e.g., pressure of the hydraulic fluid). The drive system controller may use a pressure differential determined based on the transducer outputs to calculate a torque of the motor/pump and a corresponding hose tension. Velocity, position and hose tension information allows an operator to know a position of a hose without having to see the hose (e.g., see a free end of those the hose). Velocity, position and/or hose tension information also provides fault information, such as a dead hose, a runaway hose, slow or incomplete hose stowage, incomplete trail, slow or no response, or an incorrect reference load as well as prognostic information such as an incorrect but serviceable reference load, high friction (e.g., too great a difference between extend and retract loads) and excessive backlash and/or friction (e.g., an indication of pressure and/or velocity instability).

A method is further described. A method comprises determining a velocity of a hose coupled to a hose reel rotated by a hydraulic motor/pump, the velocity determined based on an output signal from a resolver coupled to a shaft of the hydraulic motor/pump; and determining a hose position relative to a stowed position based on the velocity of the hose. The method may further comprise determining a torque of a hydraulic motor/pump rotating a hose reel, the torque determined based on a difference in an output signal from a first transducer coupled to a first fluid port of a hydraulic motor/pump and a second transducer coupled to a second fluid port of the hydraulic motor/pump; and determining a hose tension of a hose coupled to the hose reel based on the torque, wherein the output signal from each of the first transducer and the second transducer is a measurement of hydraulic fluid pressure. The method may be used to verify that the hydraulic system is operating properly. For example, where the hose reel and the hose are part of an aerial refueling system in a tanker aircraft, after rotating the hose in a trail direction from the hose reel to a free trail position, the method of determining a hose tension may include determining a reference tension at free trail. Such reference tension may be compared to a free trail load determined from sensor data separate from the output signal obtained from the first transducer and the output signal obtained from the second transducer associated with the motor/pump. If the comparison shows that the reference tension and the free trail load are within an acceptable tolerance, the method verifies that the hydraulic system is working properly.

FIG. 1 shows a schematic diagram of a portion of an aerial refueling system. Aerial refueling system 10 is provided in a tanker aircraft and is operable to fuel/re-fuel manned or unmanned air vehicles (a receiver aircraft) in flight. In this example, aerial refueling system 10 includes hydraulic system 15 that powers hose reel assembly 100 and drive system controller (DSC) 29 operable to control the operation of hose reel assembly 100. Hydraulic system 15 includes hydraulic pump 55 that is connected through a supply conduit and a return conduit to hose reel assembly 100 of aerial refueling system 10. Hydraulic pump 55 receives power from the engines of the tanker aircraft or an auxiliary power unit and pressurizes hydraulic fluid through the supply conduit which drives a motor/pump of hose reel assembly. A fluid reservoir and a filter system may also be associated with hydraulic system 15.

Hydraulic pressure is supplied by hydraulic pump 55 to motor/pump 26 of the hose reel assembly 100. Motor/pump 26 can include spline shaft 118 that is driven by, or drives, the internal mechanisms of motor/pump 26. Without going into detail, as the internal mechanisms and functions of motor/pump 26 will be known to one skilled in the art, motor/pump 26 can include inner structures, e.g., pistons, piston mounting plates, etc., that facilitate the conversion of fluid energy into mechanical energy in spline shaft 118. In one example, motor/pump 26 may include a motor mode and a pump mode. More particularly, in a pump mode, motor/pump 26 will convert mechanical energy in spline shaft 118 into fluid energy in the hydraulic fluid of aerial refueling system 10. Conversely, in a motor mode, motor/pump 26 will convert fluid energy into mechanical energy in spline shaft 118.

Spline shaft 118 can be connected to hose reel 14 of hose reel assembly 100 through various gear boxes, shafts, and couplings, as is known in the art. Additionally, hose reel 14 can connect with hose 12 and drogue 24 of hose reel assembly 100. Spline shaft 118 is operable to rotate in opposite directions corresponding to the extension and retraction of the hose. More particularly, in a pump mode, spline shaft 118 will rotate in a direction corresponding to rotation of hose reel 14 in a trail direction and extension of hose 12. Conversely, in the motor mode, spline shaft 118 will rotate in a direction corresponding to rotation of hose reel 14 in a retract direction causing retraction of hose 12.

At an end (distal or outlet end) of hose 12 is reception coupling 23 such as a MA-2, MA-3 or MA-4 coupling and drogue 24. Successful engagement between a probe of a receiver aircraft and reception coupling 23 opens a passage for the flow of fuel from the tanker aircraft to the receiver aircraft.

Figure 2:
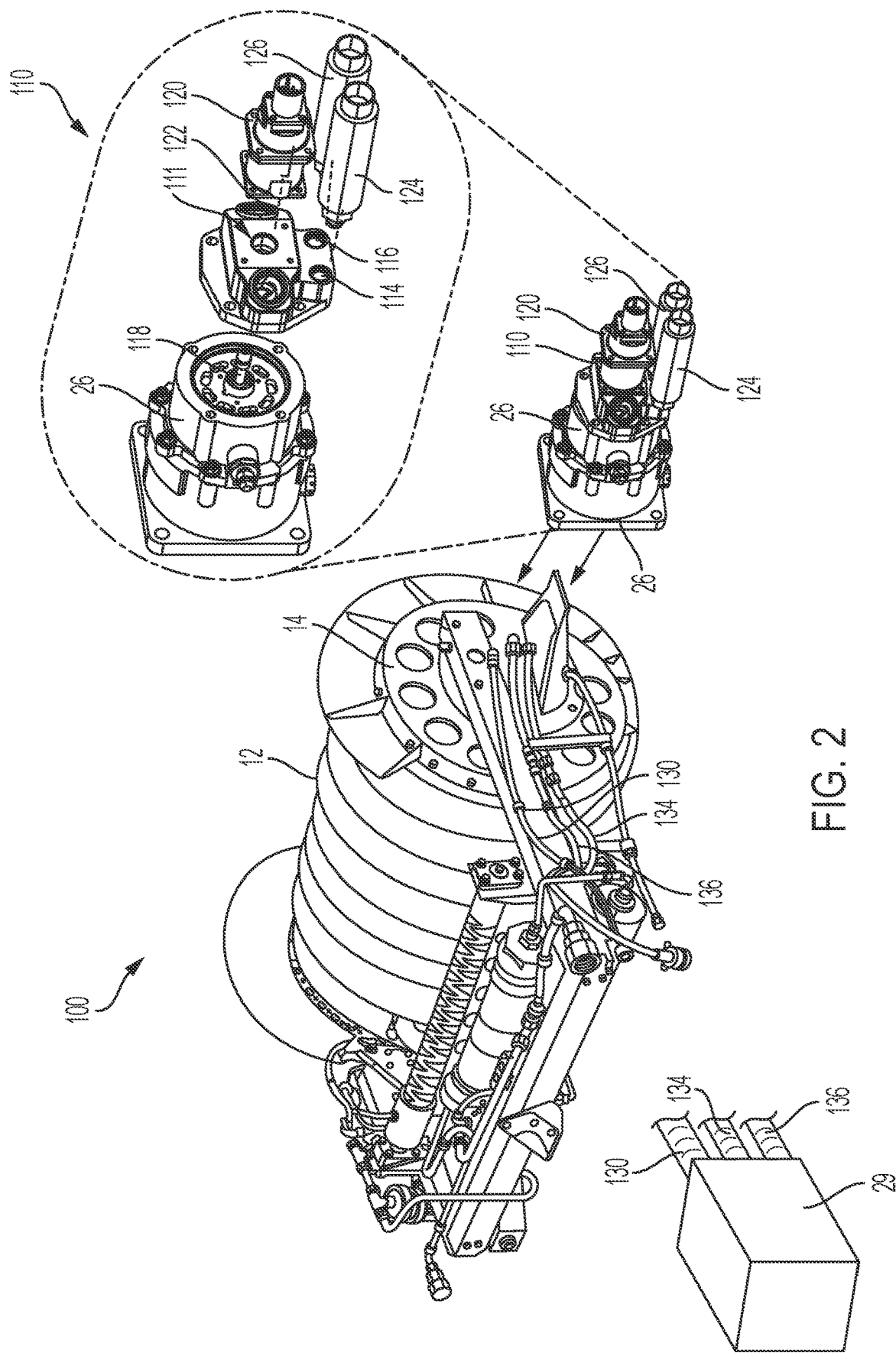
FIG. 2 shows a top side perspective view of a portion of a hose reel assembly of an aerial refueling system including a motor/pump connected to an end of a hose reel and a port cap connected to the motor/pump.

FIG. 2 shows a top perspective view of a portion of hose reel assembly 100 of aerial refueling system 10 of FIG. 1. In this example, hose reel assembly 100 includes hose reel 14 and hose 12 wrapped around hose reel 14. Connected to an end of hose reel 14 is motor/pump 26. Connected to motor/pump 26 is port cap 110. Port cap 110 includes a body having first hydraulic fluid port 114, a second hydraulic fluid port 116 and access port 111 therethrough. Access port 111 provides access through port cap 110 into hydraulic motor/pump 26 and to shaft 118. Connected to the body of port cap 110 at first hydraulic fluid port 114 is first pressure transducer 124 and connected to the body of port cap 110 at second hydraulic port 116 is second pressure transducer 126. Each of pressure transducer 124 and pressure transducer 126 is operable to detect or measure a pressure of hydraulic fluid at the port location, the pressure of fluid being either supplied to motor/pump 26 from hydraulic system 15 or discharged by motor/pump 26 to hydraulic system 15. Representative specifications for each of first pressure transducer 124 and second pressure transducer 126 include, for example, a pressure range of 0 pounds per square inch gauge (psig) to 5000 psig; an excitation voltage of 15 volts of direct current (VDC) to 45 VDC; an output voltage of 0.5 VDC to 5.5 VDC; and an operating temperature of −67 Fahrenheit (° F.) to 185° F.

Connected to the body of port cap 110 at access port 111 is resolver 120. Resolver 120 includes or is connected to shaft 122 at one end. Shaft 122 extends into motor/pump 26 and is connected, such as through a spline connection, to shaft 118 to detect a rotation of shaft 118. Resolver 120 is operable to detect or measure a speed of shaft 118.

Each of first transducer 124, second transducer 126 and resolver 120 are electrically connected through, for example, electrical conduit 134, 136 and 130, respectively, to DSC 29 and operable to provide output signals to DSC 29. First transducer 124 provides output signals to DSC 29 of a pressure of hydraulic fluid at a first hydraulic fluid port in port cap 110; second transducer 126 provides output signals to DSC 29 of a pressure of hydraulic fluid at a second hydraulic fluid port in port cap 110; and resolver provides output signals to DSC 29 of a rotational position of shaft 118.

DSC 29 contains non-transitory machine-readable instructions that include instructions to excite resolver 120 and to determine a velocity of hose 12 and a position of the hose based on output signals from the resolver. Hose velocity and position may be determined by output signals of resolver 120 that provide differences in rotational position. The instructions in DSC 29 include instructions to divide the differences in rotational position by a sample time to get a velocity in revolutions per minute (rpm) in motor/pump 26.

Additional instructions include instructions to calculate a hose velocity by translating the rpm through a gear box ratio and a hose wrap radius on hose reel 14 to obtain a hose velocity. A hose position at any time may be integrated from the determined hose velocity through the provided instructions in DSC 29.

DSC 29 also contains non-transitory machine-readable instructions that include instructions to determine a torque of hydraulic motor/pump 26 and hose tension of hose 12 based on output signals from first transducer 124 and second transducer 126. A torque of motor/pump 26 may be determined based on a displacement of the motor/pump and a pressure difference at a given time between the hydraulic fluid inlet (e.g., measured at first transducer 124) and the hydraulic fluid outlet (e.g., measured at second transducer 126). A calculated torque may be translated to a hose tension accounting for the gearbox ratio and hose wrap radius. A correction of the hose tension for friction may be made based on provided different friction coefficients for hose extension and hose retraction.

The data processed at DSC 29 from first transducer 124, second transducer 126 and resolver 120 each connected to port cap 120 provides information that can be used to monitor or operate an aerial refueling operation as well as to detect a present or potentially impending fault or failure in aerial refueling system 10. To monitor or operate an aerial refueling operation, the data may be provided to an operator of aerial refueling system 10 at the time of processing, such as by providing it in display form on a display used by an operator of aerial refueling system 10. Such data may include a hose speed and/or position during a hose extension (trail) or retraction operation or during a refueling operation. Such data may also include hose tension or load data, such as providing a reference hose tension or load when hose 12 is in free trail, a hose tension or load after engagement of hose 12 by a receiver aircraft and a hose tension or load after a hose response to reduce a slack in hose 12.

Immediate detectable faults that may be detected from velocity (speed) and position data include: Dead hose (e.g., no response on rewind); runaway hose; incomplete hose stowage; and incomplete trail. Indication of possible near-term faults include: Slow hose stowage; incomplete trail; and slow response.

Figure 3:
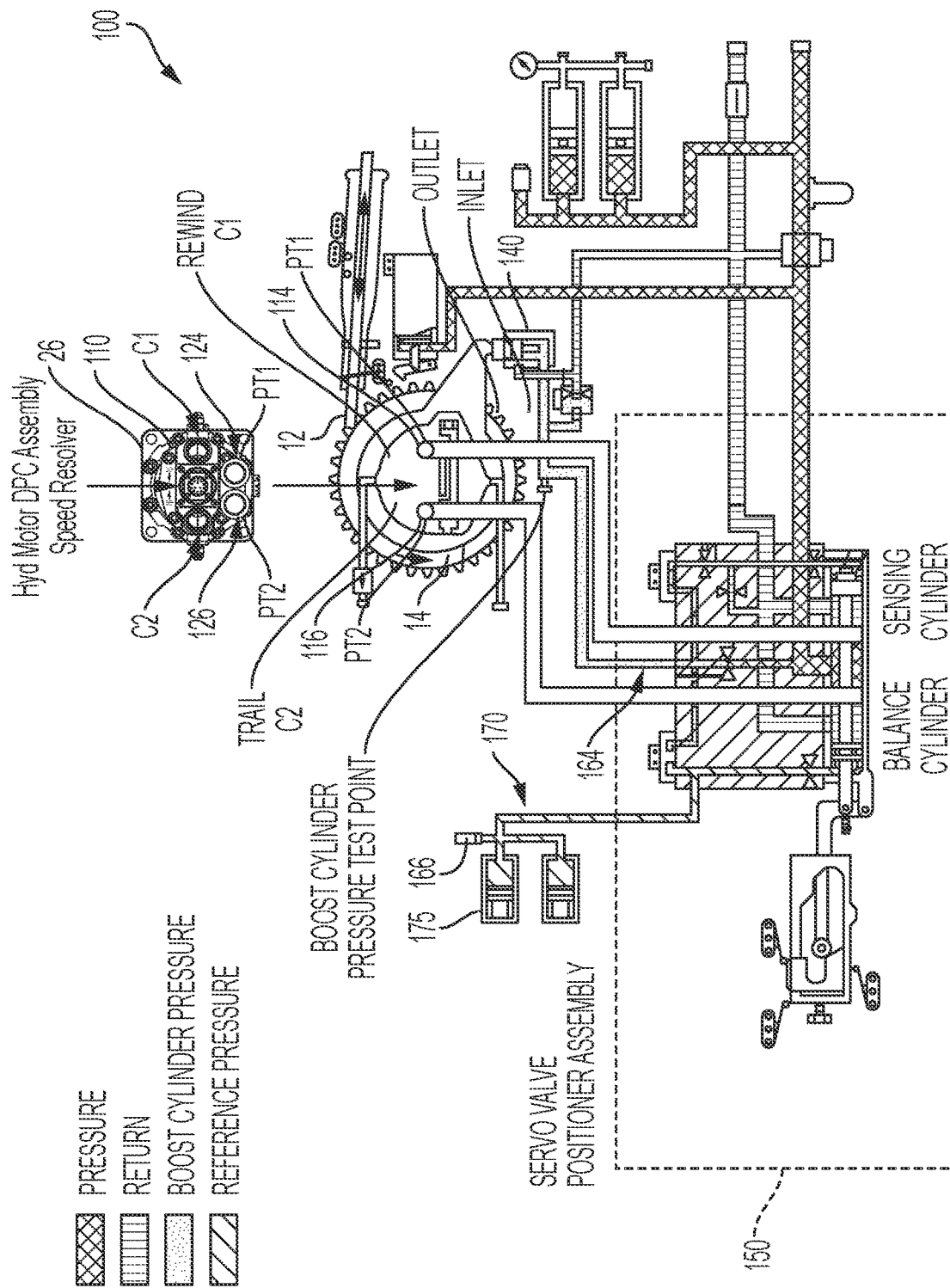
FIG. 3 shows a schematic side view of another example of a hose reel assembly of an aerial refueling system including a motor/pump connected to an end of a hose reel, a port cap connected to the motor/pump, and a boost cylinder and a servo valve control assembly connected to the motor/pump.

FIG. 3 shows a schematic side view of another example of a portion of a hose reel assembly in the hose reel portion of aerial refueling system 10 of FIG. 1. In this example, hose reel assembly 100 includes hose reel 14 and hose 12 wrapped around hose reel 14. Connected to an end of hose reel 14 is motor/pump 26. Connected to motor/pump 26 is port cap 110. Port cap 110 includes a body having hydraulic fluid inlet port, a hydraulic fluid outlet port and an access port therethrough, with first transducer 124, second transducer 126 and resolver 120 respectively positioned as in the example described in FIG. 2. FIG. 3 also shows the hose reel assembly including boost cylinder 140 and servo valve control assembly 150 including a servo valve connected to motor/pump 26. Boost cylinder 140 is a load sensing pressure cylinder that controls the servo valve. The servo valve controls a direction of motor/pump 26, as well as a speed and a torque. For purposes of this discussion, the hose reel assembly shown in FIG. 3 further includes reference pressure accumulator 170. Reference pressure accumulator 170 captures a pressure in boost cylinder 140 at a point separate from port cap 110 of motor/pump 26 (separate from a pressure at first transducer 124 or a pressure at second transducer 126 of port cap 120 connected to motor/pump 26), with such pressure being proportional to a torque in motor/pump 26. Connected to reference pressure accumulator 170 is third transducer 166 that is, for example, a pressure transducer, that measures hydraulic fluid pressure at reference pressure accumulator 170. Third transducer 166 is electrically connected to DSC 29 and operable to provide output signals to DSC 29.

With the data provided by the sensors connected to port cap 110 and the data provided by third transducer 166 at reference pressure accumulator 170, aerial refueling system 10 allows a response readiness verification that pressures are adequate and mechanical linkages, switches, relays, solenoids, etc. are in necessary working condition. A pressure transducer may also be added between boost cylinder 140 and servo valve control assembly 150 and electrically connected to DSC 29 to provide additional verification that the various components are in necessary working order.

A representative method of deploying hose 12 of aerial refueling system 10 (a trail operation) illustrates the response readiness verification provided by the sensors in port cap 110 and reference pressure accumulator 170. During a trail operation, motor/pump 26 is in pump mode and servo valve in servo valve control assembly 150 directs hydraulic fluid into motor/pump 26 through hydraulic fluid port 116 and return hydraulic fluid from the motor/pump through hydraulic fluid port 114 (a pump mode). Second transducer 126 and first transducer 124, respectively, sense the pressure of the hydraulic fluid as it enters or returns from the respective port and verify motor/pump 26 is in pump mode and operating properly. In pump mode, the pump outlet at hydraulic fluid port 114 may be restricted to create resistance and braking on hose reel 14 to slow the trail of hose 12 as it is unwound. Thus, the pressure at first transducer 124 will be greater than a pressure at second transducer 126. Also, the unwinding or trailing of hose 12 trails off of hose reel 14 that may be detected by resolver 120 and is an indication that servo valve control assembly 150 of the system is working properly.

During trail, a reference accumulator pressure measured at third transducer 166 will change to match a torque on motor/pump 26 measured by a difference in pressure at first transducer 124 and second transducer 126. As hose 12 passes a preset trail position, preset trail switch 175 actuates to stop the flow of hydraulic fluid through hydraulic port 116. This actuation may be verified by a pressure at third transducer 166 stabilizing while the load on motor/pump 26 fluctuates as hose 12 comes to a stop. A location of the hose stop (a fully-trailed position or free trail) may be determined by output data from resolver 120 as described above.

Output data from third transducer 166 may be used to detect a pressure at reference pressure accumulator 170. A pressure measured at third transducer 166 at free trail is directly proportional to a hose tension at free trail or reference tension. The pressure measured at third transducer 166 may be compared to the reference tension determined using a differential pressure of first transducer 124 and second transducer 126 at port cap 120. That the pressure measured at third transducer 166 is within an acceptable tolerance with respect to the reference tension is an indication that the hydraulic system including motor/pump 26, boost cylinder 140 and servo valve control assembly 150 and associated valves, switches, solenoids, relays, etc. are working properly. Thus, signals from first transducer 124, second transducer 126, resolver 120 and third transducer 166 as described are used to verify that the hose reel system is functioning properly which is an indication that when a receiver aircraft engages drogue 24 and creates slack that reduces the hose tension below the reference tension, the system will function properly to rewind/retract hose 12 to reduce or remove the slack.

It should be appreciated in that using pressure sensed by third transducer 166 at pressure accumulator is an example of a how to determine a free trail load at a point separate from the port cap (separate from using a differential pressure in motor/pump 26 at free trail). Another example may be through the use of a load cell or load cells on hose 12 that provide a signal or signals to DSC 29 that may be representative of or translated into a free trail load.

Although the above description is directed at aerial refueling systems including a hose reel assembly, it is appreciated that the implementation of sensors in a hydraulic motor/pump port cap to monitor, diagnose and/or improve an operation of a system in which a motor and/or pump is utilized may be employed in other systems that utilize hose reels and cable reels. Motor driven hose reel examples include, but are not limited to, ground fuel transfer, fire and rescue operations, and agricultural operations. Motor driven cable reel applications include but are not limited to fire and rescue winches and hoists and construction (e.g., crane hoists).

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims and aspects appended and any and all equivalents thereof.

What is claimed is:

1. An apparatus comprising:
   a port cap operable to be coupled to a hydraulic motor/pump, the port cap comprising a first fluid port, a second fluid port and an access port;
   a first transducer coupled to the port cap through the first fluid port;
   a second transducer coupled to the port cap through the second fluid port; and
   a resolver coupled to the port cap through the access port, the resolver comprising a splined shaft to couple to an output shaft of the hydraulic motor/pump when the port cap is coupled to the hydraulic motor/pump.

2. The apparatus of claim 1, wherein each of the first transducer and the second transducer comprise a pressure transducer.

3. The apparatus of claim 1, further comprising a hydraulic motor/pump, wherein the port cap is coupled to the hydraulic motor/pump.

4. A system comprising:
   a hydraulic motor/pump;
   a drive system controller;
   a port cap coupled to the hydraulic motor/pump, the port cap comprising a body comprising a first fluid port, a second fluid port and an access port;
   a first transducer coupled to the drive system controller and to the body through the first fluid port;
   a second transducer coupled to the drive system controller and to the body through the second fluid port; and
   a resolver coupled to the drive system controller and to an output shaft of the hydraulic motor/pump through the access port.

5. The system of claim 4, wherein the hydraulic motor/pump is coupled to a hose reel, the hose reel comprising a hose coupled thereto, wherein the hydraulic motor/pump is operable to rotate the hose reel in an extend direction to extend the hose from the hose reel and an opposite retract direction to retract the hose to the hose reel and wherein the drive system controller is operable to determine a velocity of the hose using an output signal from the resolver.

6. The system of claim 5, wherein the drive system controller is operable to determine a hose position relative to a stowed position based on the velocity of the hose.

7. The system of claim 4, wherein the hydraulic motor/pump is coupled to a hose reel of an aerial refueling system, the hose reel comprising a hose coupled thereto wherein the hydraulic motor/pump is operable to rotate the hose reel in an extend direction to extend the hose from the hose reel and an opposite retract direction to retract the hose to the hose reel and wherein the drive system controller is operable to determine a tension on the hose using an output from the first transducer and an output from the second transducer.

8. The system of claim 7, wherein a direction the hydraulic motor/pump is operable to rotate is determined by a servo valve coupled to hydraulic motor/pump.

9. The system of claim 8, further comprising a third transducer operable to measure a hydraulic pressure at the servo valve.

10. The system of claim 9, wherein the hose reel is a hose reel of an aerial refueling system.

11. A method comprising:
    determining a velocity of a hose coupled to a hose reel rotated by a hydraulic motor/pump, the velocity determined based on an output signal from a resolver coupled to a shaft of the hydraulic motor/pump;
    determining a hose position relative to a stowed position based on the velocity of the hose;
    determining a torque of a hydraulic motor/pump rotating a hose reel, the torque determined based on a difference in an output signal from a first transducer coupled to a first fluid port of a hydraulic motor/pump and a second transducer coupled to a second fluid port of the hydraulic motor/pump; and
    determining a hose tension of a hose coupled to the hose reel based on the torque.

12. The method of claim 11, wherein the output signal from each of the first transducer and the second transducer is a measurement of hydraulic fluid pressure.

13. The method of claim 11, wherein the hose reel and the hose are part of an aerial refueling system in a tanker aircraft and, after rotating the hose in a deploy direction from the hose reel to a free trail position, determining a hose tension comprises determining a reference tension at free trail.

14. The method of claim 13, further comprising determining a free trail load using sensor data separate from the output signal obtained from the first transducer or the output signal obtained from the second transducer and comparing the reference tension to the determined free trail load.

15. The method of claim 14, wherein the sensor data is a pressure in the hydraulic system.

* * * * *